US005436619A

United States Patent [19]

Yun

[11] Patent Number: 5,436,619

[45] Date of Patent: Jul. 25, 1995

[54] METHOD OF DISPLAYING MESSAGE AND STATE IN A PAGING RECEIVER

[75] Inventor: Young-Han Yun, Suwon-city, Rep. of Korea

[73] Assignee: SamSung Electronics Co., Ltd., Suwon, Rep. of Korea

[21] Appl. No.: 357,993

[22] Filed: May 30, 1989

[30] Foreign Application Priority Data

Sep. 29, 1988 [KR] Rep. of Korea ................ 1988-12637

[51] Int. Cl.[6] ................ H04Q 1/00

[52] U.S. Cl. ................ 340/825.44

[58] Field of Search ................ 340/825.44, 825.48, 340/311.1

[56] References Cited

U.S. PATENT DOCUMENTS

| | | | |
|---|---|---|---|
| 4,419,668 | 12/1983 | Ganucheau, Jr. | 340/825.44 |
| 4,477,808 | 10/1984 | Ichikawa | 340/825.44 |
| 4,660,032 | 4/1987 | Tsunoda | 340/825.44 |
| 4,704,608 | 11/1987 | Sato et al. | 340/825.44 |
| 4,796,024 | 1/1989 | Sakoh et al. | 340/825.44 |
| 4,821,021 | 4/1989 | Ide et al. | 340/825.44 |

FOREIGN PATENT DOCUMENTS

| | | | |
|---|---|---|---|
| 0297366 | 1/1989 | European Pat. Off. | 340/825.44 |
| 2116342 | 9/1983 | United Kingdom | 340/825.44 |

OTHER PUBLICATIONS

Motorola Publication, "PMR 2000 Personal Message Receiver", 1986.

*Primary Examiner*—Donald J. Yusko
*Assistant Examiner*—Brian Zimmerman
*Attorney, Agent, or Firm*—Robert E. Bushnell

[57] ABSTRACT

A control apparatus for controlling a paging receiver capable of displaying a corresponding message and a state information includes an antenna 1 for receiving an RF signal; an RF receiver 2 for demodulating received RF modulation signal from the antenna 1; a waveform shaper 3 for shaping waveforms into a secondary signal after filtering the demodulated signal; a micom 4 for controlling the paging receiver; an EEPROM 5 for discriminating data of the paging receiver; an alert driver 6 for generating an alert signal under the control of the micom 4; a speaker 7 for generating an alert tone by the alert driver 6; an LCD device 8 for displaying the data under the control of the micom 4; a key input 9 for generating a first key data signal and a second key data signal; and a state driver 10 for displaying the state of the paging receiver.

28 Claims, 7 Drawing Sheets

METHOD OF DISPLAYING MESSAGE AND STATE IN A PAGING RECEIVER

BACKGROUND OF THE INVENTION

The present invention relates to a paging receiver, and in particular to a method, in case of inputting a message or a key, capable of displaying the corresponding message and a state information.

Generally, since a paging receiver is small in size, an LCD (liquid crystal display) device which displays a message and a state may display 12 digits of data, and use a memory indicator so as to indicate a memory address.

However, there has been a problem that the magnitude of a segment for displaying a message of an LCD device suffers limitations because of an indicator displaying each memory address when memory information for a received message was increased, and because the indicator itself was so small that an user could not easily recognize it.

SUMMARY OF THE INVENTION

Therefore, it is an object of the present invention to provide a displaying method,in a paging receiver, capable of displaying a memory address on an LCD device with a memory indicator being removed and displaying a message number being currently stored in a memory after a message displaying.

It is another object of the present invention to provide a method capable of displaying a message currently stored in a memory on an LCD device in case of inputting a predetermined key.

According to one aspect of the present invention, in a message displaying method of a paging receiver including a second key for operating in a silent mode and a first key for message displaying, the method comprises the steps of: a first process for storing a corresponding message in case of a message receiving state, and generating an alert tone and displaying a corresponding message, at the same time, starting a first count; a second process for checking whether the first count is terminated or not after executing the first process; a third process for checking whether the first key data is generated when it is within a first count at the second process, if not so, then it loops and displays a corresponding message; a fourth process for eliminating an alert tone in case of first count termination or in case of a first key data generation at the third process, and starting the second count; and a fifth process for checking whether the second count is terminated or not after executing the fourth process, eliminating a message display only in the case when the second count is completed, and then displaying a calling information.

The above and other objects, effects and features of the present invention will become more apparent from the following description of preferred embodiments thereof taken in conjunction with the accompanying drawings. The same reference numerals are used to designate similar parts throughout the figures.

DETAILED DESCRIPTION OF THE INVENTION

The preferred embodiment of the present invention will be explained in detail with reference to the accompanying drawings hereinbelow.

Figure 1:
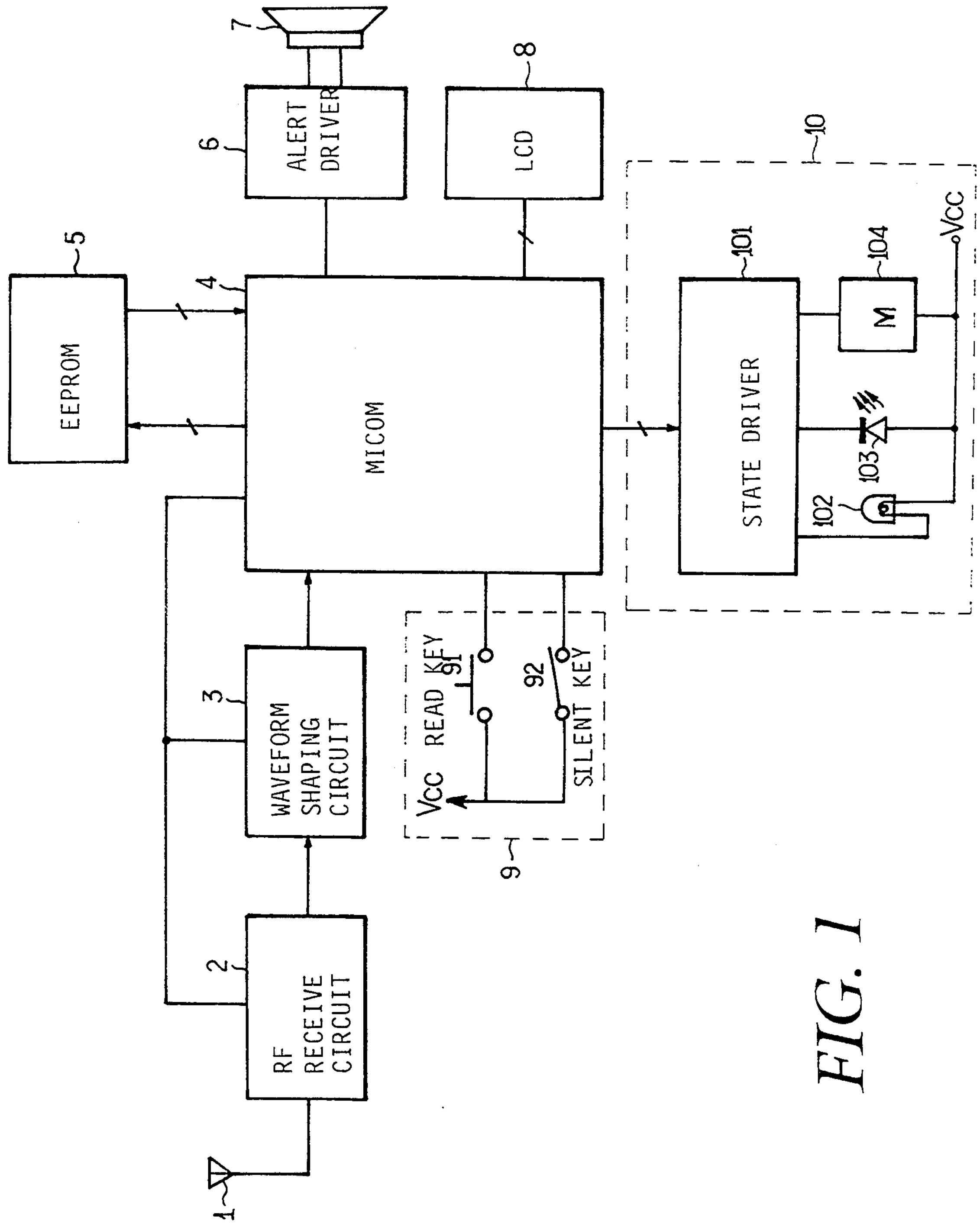
FIG. 1 is a block diagram of a paging receiver for executing the present invention.

FIG. 1 is a block diagram of a paging receiver for executing the present invention, including: an antenna 1 for receiving an RF (radio frequency) modulation signal, an RF receiver 2 for differentially demodulating the RF modulation signal received through antenna 1, a waveform shaper 3 for shaping the waveforms into a secondary signal after filtering and amplifying the demodulated signal of the RF receiver 2; an EEPROM 5 storing self intrinsic data for discriminating the data of a corresponding paging receiver; controller or a mica 4 which controls the paging receiver, outputs a control signal (BSS) for saving electric power within a predetermined period, at the same time, inputs the received data of the waveform shaper 3, thereafter compares it with the data of the EEPROM 5 to discriminate whether it is confirmed data or not, and controls the stored message display and the state of the receiver by predetermined first and second key data; an alert driver stage 8 for generating an alert signal under the control of micom 4; a speaker 7 for generating an alert tone by alert driver 6; an LCD device 8 for displaying the data under the control of the micom 4; a key input feature 9 which generates a first key data signal, composed of a read key 91 and a silent key 92, which requires display of stored message, and a second key data signal for preventing the paging receiver from generating the alert tone; and a state driver stage 10 for displaying the state of the paging receiver under the control of the micom 4.

Figure 2:
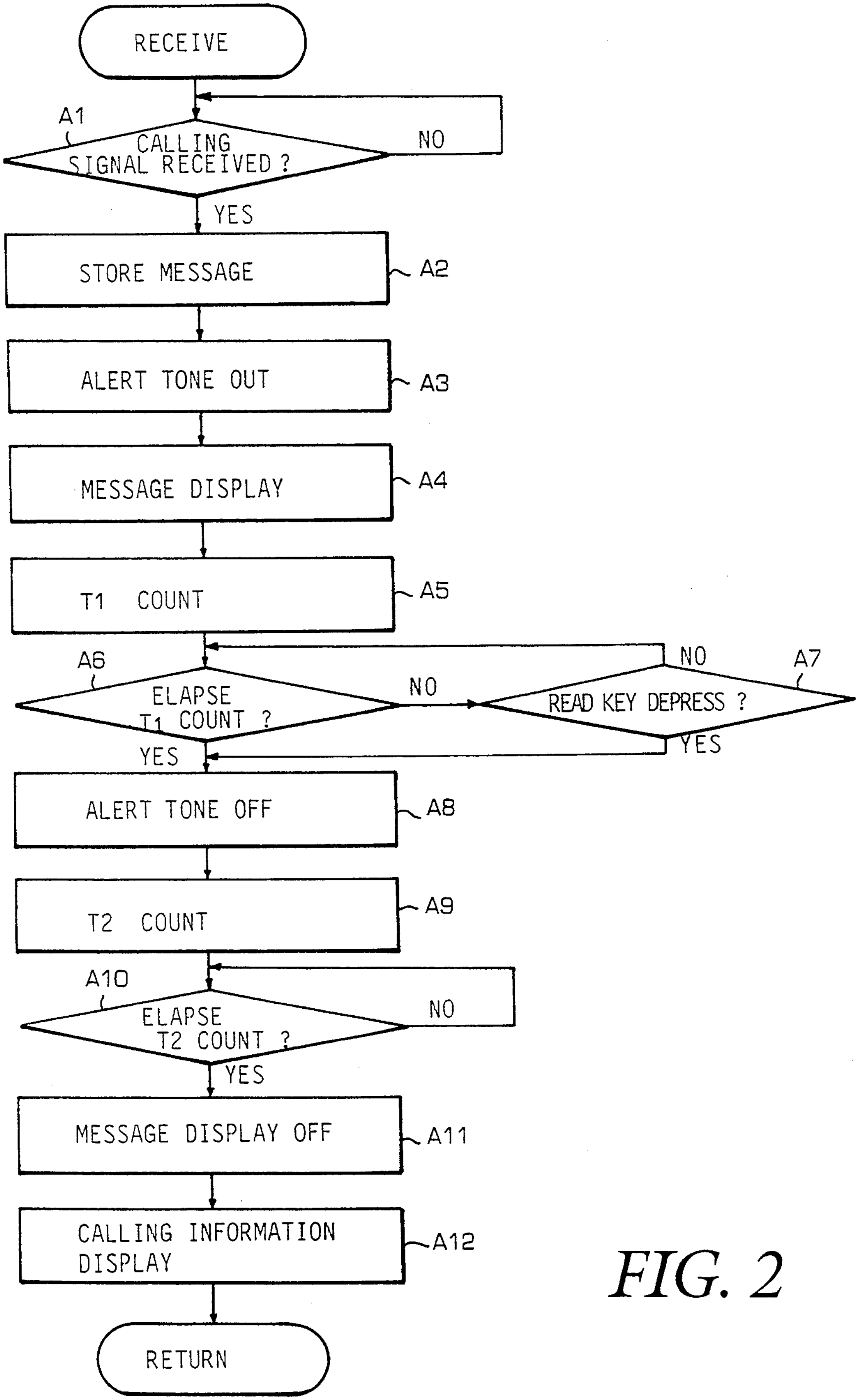
FIG. 2 is a process flow chart in case of receiving a message according to the present invention.

FIG. 2 is a flow chart illustrating the corresponding message and a calling information of a message receiver, which includes the steps of: a first process A2 which stores the corresponding message in case of a message receiving state, generates tile alert tone at A3 and displays the corresponding message at the same time at A4, and at A5 starts the first count; a second process A6 for checking whether the first count is terminated or not after the first process being executed; a third process A7 which checks whether the first key data is being generated or not in the case where the first count is being executed at the second process, if not so, loops to the second process while displaying the corresponding message; a fourth process A8 which eliminates an alert tone in case of the first count termination at the second process or a first key data signal generation at the third process, and at A9 starts the second count; a fifth process A10 which checks whether the second count is terminated or not after executing the fourth process, eliminates a message display all only in the state of the second count being completed, and thereafter at A12 displays calling information.

Figure 3A:
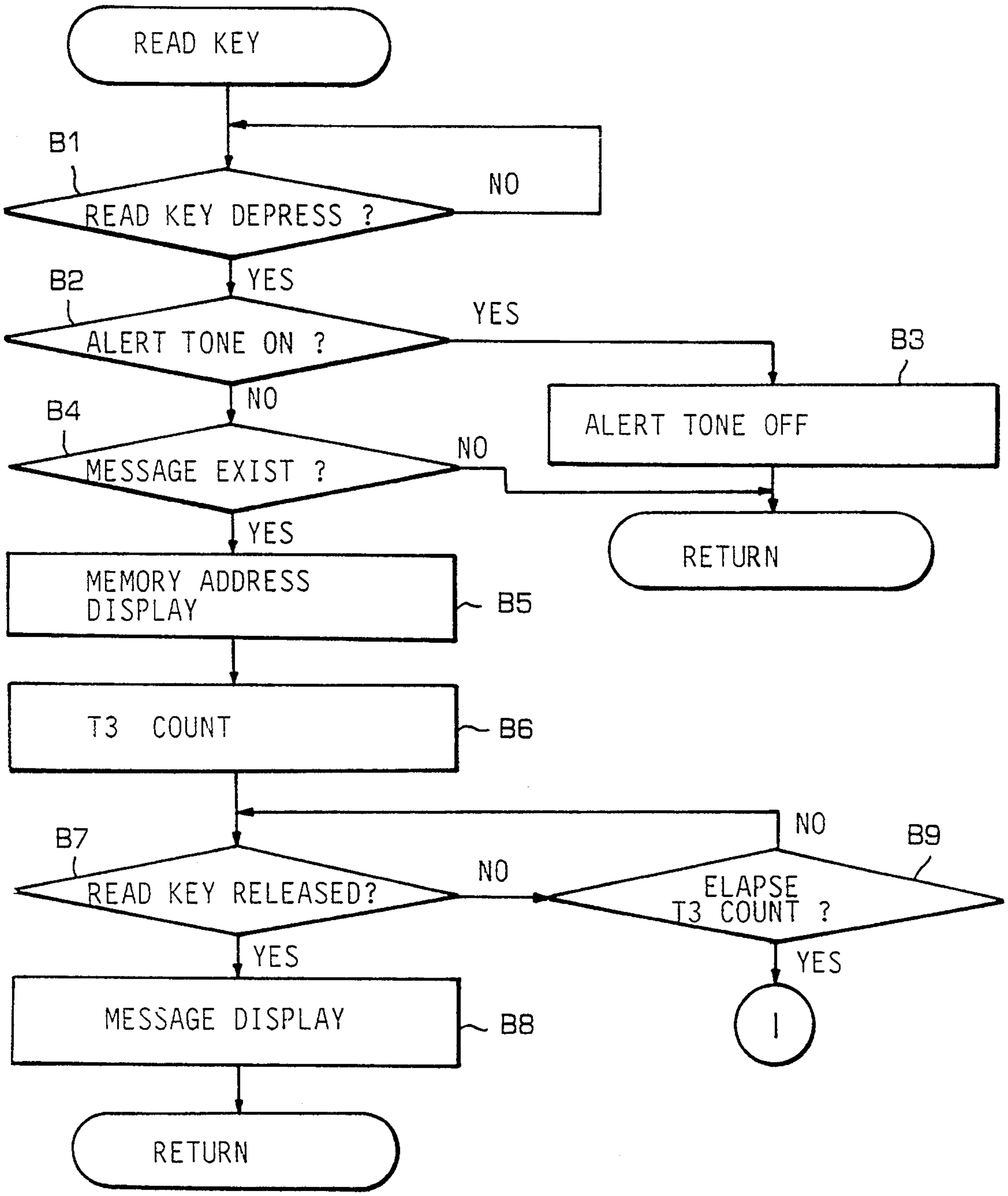
FIGS. 3A and 3B are the flow charts of a message process in accordance with a key input according to the present invention.
Figure 3B:
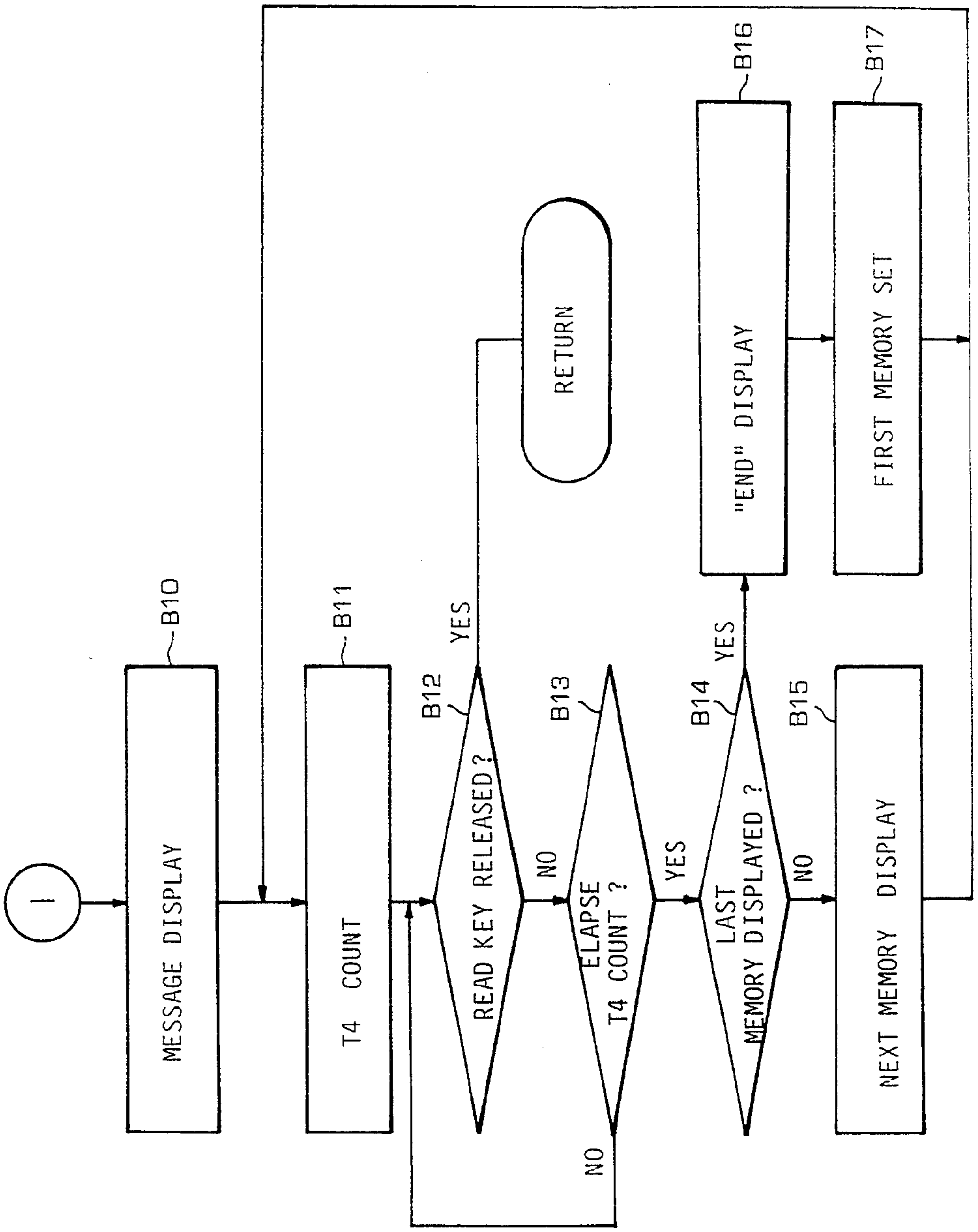

FIGS. 3A and 3B are the flow charts illustrating a memory message according to the first key data generation in a state that a message is not received and FIG. 3B is the continuation of FIG. 3A, which includes: a first process B2 which checks whether it is an alert tone driving state or not in case of first key data generation B1, terminates the alert tone during the alert tone being driven at B3 and then returns; a second process B4 which checks whether or not there exists a message stored in a memory in case the alert tone is not in operation at the first process, and returns if not so; a third process B5 which displays the predetermined memory address in case the stored information is present at the second process, and then starts at B6 the third count; a fourth process B7 which checks, after the execution of said third process, whether the first key data is in a release state or not, at B8 displays the message of corresponding address if it is in the release state, and then returns; a fifth process B10 which displays the corresponding message only at the time after completing a third count at B9 in non-release state at said fourth process; a sixth process B11 through B15 which displays sequentially the messages stored in a memory with the period of the fourth key count during the first key data generating period by starting the fourth count at B11 after the fifth process execution; and a seventh process B12 which pauses the message displaying process in case the first key data are in a released state during the sixth process execution, and then returns.

Figure 4A:
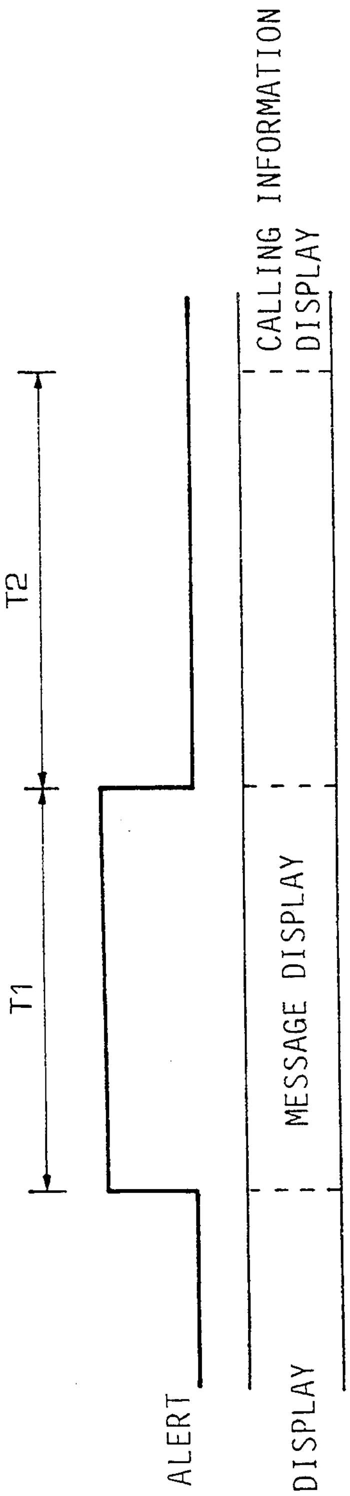
FIGS. 4A and 4B are the timing charts illustrating a message and a state in case of receiving a message according to the present invention.
Figure 4B:
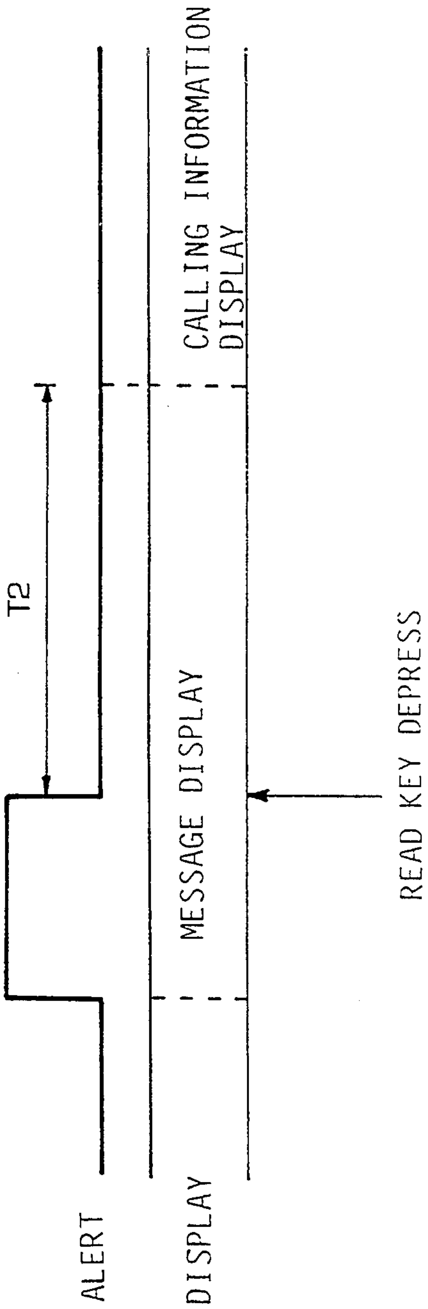

FIGS. 4A and 4B are the timing charts of an alert tone and a message display in case of message receiving, wherein FIG. 4A shows that, in case of message receiving, an alert tone is generated through the speaker 7 for a T1 period, and at the same time the delivered message from the counter party (i.e. originating side) through LCD 8 device is to be displayed, and that, however, the message is displayed continuously for T2 period, though the alert tone is eliminated when the T1 period is terminated, and calling information is displayed after the T1-T2 periods have elapsed. FIG. 4B is the case that the first key data is generated while displaying a received message. In this case, the alert tone is paused from the first key data inputting time point in this case, thereafter, however, the message is displayed continuously through the LCD 8 device for T2 period.

Figure 5A:
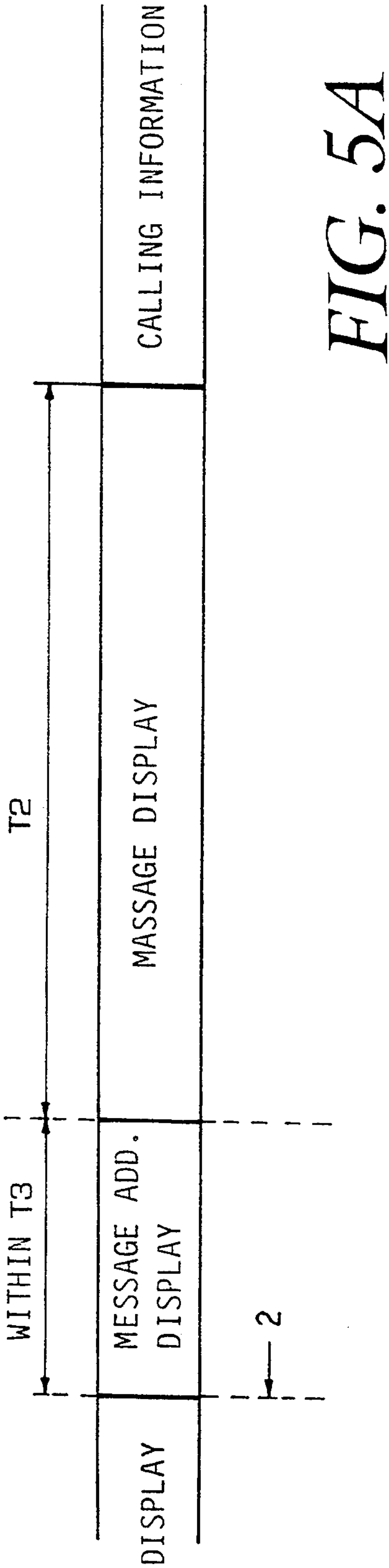
FIGS. 5A and 5B are the timing table illustrating a stored memory in case of inputting a key according to the present invention.
Figure 5B:
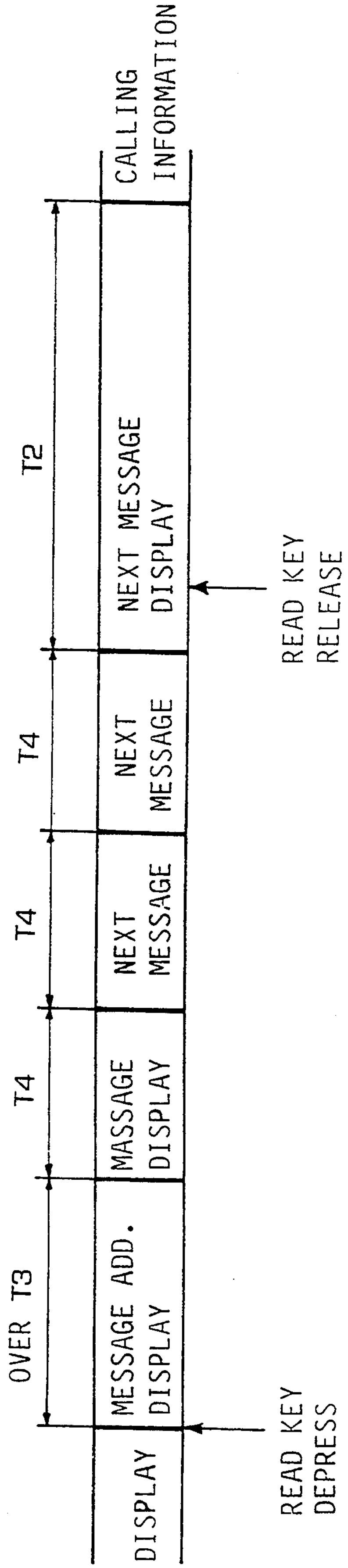

FIGS. 5A and 5B are the timing tables which display the message stored in memory within a micom 4 in case the first key data is received at a state when a message is not being received, that is to say, at a state of the calling information being displayed, wherein FIG. 5A displays the address of a message to be displayed within a T3 period of time in case the first key data being released (that is, in case that the first key data are once generated), and displays the message of corresponding address for a T2 period of time, thereafter the calling information is displayed. FIG. 5B, as the case that the first key data is continuously generated, displays the state of an auto scan. It displays an address of initial message to be displayed for T3 period of time, thereafter displays sequentially, through the LCD 8 device, the message stored in an internal memory of mica 4 with the time interval of T4 until the first key data is released and the message of the first key data releasing time point is displayed for T2 period of time.

Figure 6A:
FIGS. 6A to 6D are the displaying diagrams of the state information in a paging receiver according to the present invention.
Figure 6B:
Figure 6C:
Figure 6D:
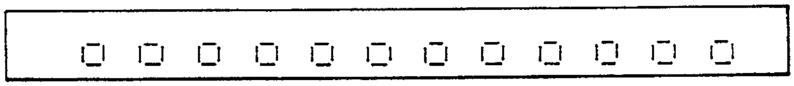

FIGS. 6A to 6D are the display diagrams of calling information displayed on LCD 8 device at the state that the message is not received, wherein FIG. 6A is a diagram displaying a state in case of a low voltage battery, FIG. 6B displays the number of any unread message, which is received in a silent mode, stored in an internal memory of the mica 4, FIG. 6C displays the message numbers stored in an internal memory of the mica 4 in a normal mode (a mode displaying the message on an LCD 8 device and driving the alert tone upon receiving a message), and FIG. 6D is a diagram displaying an idle state.

Figure 7A:
FIGS. 7A and 7B are the displaying diagrams of a memory address according to the present invention.
Figure 7B:
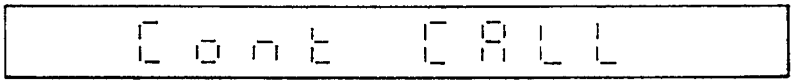

FIGS. 7A, an example for the display digit of an LCD 8 having less than 12 digits, is an address of a second message stored in a memory. Moreover, FIG. 7B is an example for having over 13 digits.

The present invention in its operation will be explained in detail in accordance with the above described configuration with reference to the FIGS. 1 to 7 as follows. Firstly, an operational process of a paging receiver will be explained.

an RF (radio frequency) receiver 2 for receiving, through an antenna 1, the RF signal modulated into FSK, after being transmitted amplifies and demodulates the received data in modulated state to output demodulated data. It is herein assumed that the received message is in the form of POCSAG code. A waveform shaper 3 receiving the demodulated signal of said RF receiver 2 filters and amplifies the demodulated data, thereafter shapes them into a logic level to apply to the micom 4. At this moment, a micom 4 turns "ON" or "OFF" the power supply by giving the battery saving signal (BSS), which is a signal for controlling the power supply of RF receiver 2 and waveform shaper 3, periodically or according to the state of the received message in order to save the power supply. Furthermore, said micom 4 stores the address contained in EEPROM 5 into an internal memory RAM upon initial power "ON", and stores also the corresponding address bits (32 bits) among POSAG codes received through the waveform shaper 3 into the memory, and thereafter compares these two addresses to discriminate whether the confirmed data is present or not. Thus, micom 4 is a one chip processor which is IC 5864 manufactured by SANYO.

EEPROM 5 includes two addresses (dual address) composed of the frame data in three bits and the address bits in eighteen bits representing a self intrinsic address of the corresponding paging receiver, while a micom 4 selects the data of self frame among the data received with eight frames per each batch by utilizing the frame data, and compares the address code word of thirty-two bits among the received data contents of self frame by utilizing the address bit and self intrinsic stored in EEPROM 5 to discriminate whether the confirmed data is present or not. Thus, if it is identified that the received data is confirmed data, a micom 4 displays the message code word on the LCD 8 device, and at the sane time generates the alert signal by driving the alert driver 6, and the speaker 7 generates the alert tone by this signal.

Aforesaid paging receiver can generate first and second key data through the key input means 9, in which the first key data is generated by a read key 91, and the second key data is generated by a silent key 92. The silent key 92 generates the key instruction for preventing the alert tone driving while receiving a message, in which case the received message is stared in an internal memory of the micom 4, and displayed, at the same time, on the LCD 8 device for the T2 period of time and, for the period of time after displaying, the calling information of the state as in FIG. 6B is to be displayed. Furthermore, a read key 91 is utilized, while receiving a message, either in case it pauses the alert tone generated for the T1 period of time as in 4B, or in case it is intended to display the message stored in an internal memory of a micom 4 on an LCD 8 device as in FIGS. 5A or 5B, while any calling information among the calling information as in FIG. 6 is displayed on an LCD.

In addition, a state displaying means lit displays various states of a paging receiver under the control of a micom 4, in which a lamp 102 makes the message display clear even in case that the discrimination of message is difficult as in night time by driving while the message is displayed on LCD 8 device, and it maintains an "OFF" state within the calling information period. An LED 103 is driven upon receiving a message and displays visually the alert state, which is driven both in the normal mode and in silent mode. Moreover, a motor M executes the function of having an user recognize it by vibrating a paging receiver in case of receiving the message at a silent mode.

Referring to the displaying process in case of message receiving of said paging receiver as above with reference to FIG. 2, at a step A1, a micom 4 checks whether a message is received or not through the waveform shaper 3. When the message receiving is confirmed, at a step A2, a micom 4 stores the received message into an internal memory of a micom 4, at a step A3, turns on the alert driver 6 and generates the alert tone, indicating that the message is being received, through the speaker 7, and at a step fit, a micom 4 starts to count the T1 period of time by operating an internal counter, wherein the T1 the period of time means, 8 seconds in the present invention, that produces the alert tone through the speaker 7 and displays tile message simultaneously on an LCD 8 device. Thereafter, it proceeds to a step A6, micom 4 checks whether the T1 period of time is elapsed or not at the first period counting the T1 period of time as aforementioned, and when it is in T1 period, then it proceeds to a step A7 to check whether the read key 91 signal is produced or not.

Hence, if the input of the read key 91 is produced within the T1 period of time, the operation as in FIG. 4B is executed, and if no read key input exists until the T1 period of time is terminated, the operation as in FIG. 4A is to be executed.

Thus, when either the T1 period of time has elapsed or the read key input is produced, the micom 4 pauses in the transmission of the alert tone at a step A8, and at step A9, renders the counter to operate again and starts the second count for the T2 period of time. The T2 period means the time displaying the message on an LCD 8 device without the alert tone, wherein it had 8 second period as the T1 period of time. Thereafter, at a step A10, when the second count operation for the T2 period of time is completed, the micom 4 turns off the message being presently displayed on an LCD 8 device at a step A11, displays the calling information at a step A2 as in FIG. 6, and terminates the displaying process of the received message.

Next, in explanation of the message display process upon the read key generation within the calling information display state on the LCD 8 device, this state begins to display any one state among the states as in FIGS. 6*a* to 6D. Hence, if the read key 91 signal is generated at a step B1, at a step B2, the micom 4 checks whether or not it is the state that the alert tone is presently generated through the speaker 7, since it is now in the message receiving state, at step B3 the alert tone is to be interrupted as in FIG. 4B, and then returns.

At said step B2, if it is not in the alert tone driving mode, that is to say, in case of the state displaying the calling information, the micom 4 checks the state of internal memory and identifies whether there is a stored message at a step B4, since the calling information display as in FIG. 6D is the case that the stored message is absent, it returns in this case.

Therefore, at said step B4, if a message is present, at step B5 the memory address is displayed in the form shown in FIG. 7, at step B6 the T3 period of time is counted. The T3 period of time is the maximum key input time capable of displaying one message, i.e., about two seconds, in case this period of time is exceeded, then the message of next address is to be displayed automatically. Therefore, as in FIG. 5A, it can be understood that the address of a message intending to be displayed is displayed within the T3 period of time filter starting the third count, at a step B7 whether the read key 91 signal is released is checked within the T3 period of time, when released, at a step B8 as in FIG. 5A, the message of the address displayed on an LCD 8 device is displayed within the T3 period of time for the T2 period of time.

Accordingly, at said step B9 if the read key 91 signal exceeds the T3 period of time, at a step B 10, the message of address that has been displayed at a previous state for the T3 period of time as in FIG. 5B is displayed, at a step B11 counting T4 period of time is started. Wherein T4 means the period of time displaying one message at a state of depressing the read key 91. After executing said step B11, at a step B12 whether the read key 91 signal is released is checked. If the read key 91 signal is being generated, then at a step B13 whether the T4 period of time is not terminated is checked. Thus, if it is in the state that the T4 period of time is not terminated, a corresponding message is continuously displayed on an LCD 8 device without changing.

Thus, at step B13, if the T4 period of time is terminated then, at step B14 whether or not the last messages stored in an internal memory of the micom 4 are displayed is checked, then if not so, at a step B15 the message of a next address displayed presently is read out to be displayed on an LCD 8 device, and then it returns to said step B11 again. That is to say, at a state of depressing the read key 91, the message stored in the memory as in FIG. 5D is to be displayed on the LCD 8 device in accordance with the sequential address within the T4 period of time.

Accordingly, at said step B12, if the read key 91 is released as in FIG. 5B at any period of time, the message in the release time is displayed on the LCD 8 for the T2 period of time, then the calling information is displayed. Furthermore, at said step B14 while it is in a state that the read key 91 signal is being generated, if a situation occurs in which all message saved in a memory is displayed, it proceeds to steps B16 and B17, and a first address of the memory on LCD 8 device is set, thereafter it returns to said step B11.

Thus, the present invention eliminates the memory address indicator on a small size LCD pannel as above, which can utilize an LCD effectively because it can display the visual message and the calling information on an LED for displaying the message, and which is capable of executing the data display and the auto scan of tile memory by the read key operation; therefore there is an advantage that message display can be easily executed.

Although specific constructions have been illustrated and described herein, it is not intended that the invention be limited to the elements and constructions disclosed. One skilled in the art will recognize that the particular elements or sub-constructions may be used without departing from the scope and spirit of the invention.

What is claimed is:

1. A method for displaying a message and operational state in a paging receiver, comprising the steps of:

monitoring the paging receiver and storing a message when received;

enabling emission of an audible tone for a first predetermined time period when said message is stored;

displaying said message for said first predetermined time period when a read key is depressed;

displaying said message for a second predetermined time period without emitting said audible tone;

terminating emission of said audible tone whenever a read key is depressed; and displaying calling information at the end of said second predetermined time period.

2. The method according to claim 1 wherein said step of terminating comprises the steps of:

receiving a read signal from said read key; and stopping emission of said audible tone.

3. The method according to claim 2 wherein said step of stopping emission comprises a shortening said first predetermined time period when said read signal is received.

4. The method according to claim 1 wherein said step of monitoring comprises the step of checking an output of a waveform shaping circuit to determine whether a message is received.

5. The method according to claim 1 wherein said step of creating an audible tone comprises the step of activating a timer circuit having a duration equal to said first predetermined time period.

6. The method according to claim 1 wherein said step of displaying comprises the steps of:

reading said message from memory; and applying said message to a liquid crystal display.

7. A method for displaying a message and operational state in a paging receiver operating in a normal mode and a silent mode, comprising the steps of:

monitoring the paging receiver and storing a message in a memory when received;

enabling emission of an alert tone for a predetermined time period when said message is stored;

determining whether the paging receiver is operating in the silent mode;

suppressing said alert tone when said paging receiver is in the silent mode;

determining whether a message is stored in said memory when said alert tone is suppressed;

displaying the memory address of the message;

displaying said message for said predetermined time period when a read key is depressed;

terminating said alert tone and causing an end of said predetermined time period whenever said read key is depressed; and displaying calling information at the end of said predetermined time period.

8. The method according to claim 7 wherein said step of determining whether the paging receiver is operating in the silent mode further comprises returning to said step of monitoring when the paging receiver is operating in the normal mode, 9. The method according to claim 7 wherein said step of determining whether a message is stored in said memory step further comprises returning to said monitoring step when no message is stored in said memory.

10. The method according to claim 7 wherein said step of monitoring comprises the step of checking the output of a waveform shaping circuit to determine whether a message is received.

11. The method according to claim 7 wherein said step of creating an alert tone comprises the step of:

activating a timer circuit having a duration equal to said predetermined time period.

12. The method according to claim 7 wherein said step of displaying comprises the steps of:

reading said message from memory; and applying said message to a liquid crystal display.

13. The method according to claim 9 wherein said step of terminating comprises the steps of:

receiving a read signal from said read key; and stopping said alert tone.

14. The method according to claim 13 wherein said step of stopping emission comprises the step of shortening said predetermined time period to cause said end when said read signal is received.

15. A method for displaying a message and operational state in a paging receiver, comprising the steps of:

monitoring the paging receiver and storing a message when received by checking the output of a waveform shaping circuit to determine whether a message is received;

enabling emission of an audible tone for a predetermined time period when said message is stored by activating a timer circuit having a duration equal to said predetermined time period;

displaying said message for said predetermined time period when said read key is depressed by reading said message from memory and inputting said message to a liquid crystal display;

displaying said message for a second predetermined time period without said audible tone;

terminating said audible tone whenever a read key is depressed by receiving a read signal from said read key and stopping said audible tone by shortening said predetermined time period to end when said read signal is received; and displaying calling information at the end of said predetermined time period.

16. A method for displaying information on a paging receiver having a liquid crystal display comprising the steps of:

checking for an input signal from a read key of said paging receiver;

checking whether or not an audible alarm is being generated by an alert driver of said paging receiver if there is an input signal from said read key and, if said audible alarm is being generated, turning said audible alarm off;

checking a memory of said paging receiver for an existing message and, if there is an existing message in said memory, displaying a memory address corresponding to said existing message;

starting a first count for a first time period simultaneously with the displaying of said memory address;

checking whether or not said first time period has elapsed and if said time period has not elapsed checking for a loss of said input signal from said read key during said first time period and, if said input signal from said read key has been lost, going to a step displaying said existing message for a second time period, or if said input signal from said read key has not been lost checking again whether or not said first time period has elapsed and, if said first time period has not elapsed, repeating said step of checking for a loss of said input signal from said read key;

displaying said existing message if said input signal from said read key has been lost or after said first time period has elapsed and, simultaneously starting a second count for a third time period, said existing message being displayed during said third time period;

checking said memory for further existing messages and displaying each further existing message for a corresponding fourth time period after said third time period has elapsed;

changing the displaying time of a message currently being displayed, if there is a loss of said input signal from said read key during said fourth time period, to said second time period; and displaying a calling information after any message that was displayed for said second time period.

17. The method for displaying information on a paging receiver having a liquid crystal display as set forth in claim 16 wherein said step of checking said memory for further existing messages further comprises the steps of:

checking for a loss of said input signal from said read key during said third time period and, if said input signal from said read key has not been lost, determining if said third time period has elapsed.

18. The method for displaying information on a paging receiver having a liquid crystal display as set forth in claim 17, wherein said third time period has the same duration as said fourth time period.

19. The method for displaying information on a paging receiver having a liquid crystal display as set forth in claim 16 wherein said third time period has the same duration as said fourth time period.

20. An apparatus for displaying information on a paging receiver, comprising:

means for receiving and demodulating a radio frequency signal including message data, and for outputting a demodulated signal including said message data;

waveform shaping means for filtering and amplifying said demodulated signal to output a shaped signal;

microprocessor means for providing a comparison signal in dependence upon a comparison of said shaped signal with stored intrinsic data, and for producing a comparison signal;

means for emitting an audible alarm;

means for displaying a message;

first manually operable means for generating first key data;

second manually operable means for generating second key data;

wherein said microprocessor means:

receives and stores said message data according to said comparison signal, initiates an audible alert signal, starts a first count having a first time period and transmits said received message data to said displaying means, checks whether said first count has terminated during the generation of said audible alert signal, and if said first count has terminated, stops generation of said audible alert signal, checks whether said first key data has been generated by said first manually operable means during said first time period, and if no first key data has been generated by said first manually operable means, rechecks whether said first count has terminated, stops the generation of said audible alert signal if said first manually operable means generates said first key data, starts a second count having a second time period after said audible alert signal has been stopped, checks for completion of said second count and ends the displaying of said received message data when said second count has been completed, and outputs calling information for display on said displaying means after ending the displaying of said received message data.

21. The apparatus as claimed in claim 20, wherein said microprocessor means:

determines if said second manually operable means has generated said second key data, and suppresses the generation of said audible alert signal if said second key data has been determined to have been generated.

22. The apparatus as claimed in claim 21, further comprising:

means for vibrating the paging receiver when said microprocessor means receives a message and after said second key data has been generated.

23. A method for displaying information on a paging receiver having a liquid crystal display comprising the steps of:

receiving and storing a message at a corresponding memory address in a memory of said paging receiver;

generating an audible alert tone, starting a first count having a first time period and displaying said received message on said liquid crystal display;

checking whether or not said first count has terminated during the generation of said audible alert tone, and if said first count has terminated, stopping the generation of said audible alert tone;

checking, during said first time period, whether or not there is an input signal from a read key of said paging receiver, and if there is no input signal from said read key, returning to said step of checking whether or not said first count has terminated;

stopping the generation of said audible alert tone if there is an input signal from said read key;

starting a second count having a second time period after said audible alert tone has been stopped following either of said steps of checking;

checking for completion of said second count and ending the displaying of said received message when said second count has been completed; and displaying a calling information after ending the displaying of said received message.

24. The method for displaying information on a paging receiver having a liquid crystal display as set forth in claim 23, wherein the step of receiving said message comprises the step of:

checking an output of a waveform shaping circuit of said paging receiver for determining whether a message is received.

25. The method for displaying information on a paging receiver having a liquid crystal display as set forth in claim 24, wherein the step of receiving said message further comprises the steps of:

inputting data of said message when said step of determining whether a message is received indicates a message has been received from said waveform shaping circuit;

comparing the data of said message with self intrinsic data stored in another memory of said paging receiver to determine whether or not said data is confirmed; and controlling said step of storing said message at said corresponding memory address if said step of comparing the data determines said data is confirmed.

26. The method for displaying information on a paging receiver having a liquid crystal display as set forth in claim 23, further comprising the steps of:

determining if said paging receiver is operating in a silent mode of operation, wherein said silent mode coincides with said steps of stopping the generation of said audible alert tone or when a silent key on said paging receiver is depressed;

storing received messages when said paging receiver is operating in said silent mode of operation; and displaying, as said calling information, information indicating the number of messages received during said silent mode of operation.

27. The method for displaying information on a paging receiver having a liquid crystal display as set forth in claim 23 wherein said first count is equal to said second count.

28. The method for displaying information on a paging receiver having a liquid crystal display as set forth in claim 23 further comprising the steps of:

determining if a silent key of said paging receiver has been depressed; and suppressing the generation of said audible alert tone if said silent key has been depressed.

* * * * *

UNITED STATES PATENT AND TRADEMARK OFFICE

CERTIFICATE OF CORRECTION

PATENT NO. : 5,436,619

DATED : July 25, 1995

INVENTOR(S) : Young-Han Yun

It is certified that error appears in the above-indentified patent and that said Letters Patent is hereby corrected as shown below:

| | | |
|---|---|---|
| Column 1 | Line 56, | after "displaying", delete "a", |
| Column 2 | Line 7, | after "timing", change "table" to --tables--, |
| | Line 30, | before "4", change "mica" to --micom--, |
| | Line 39, | after "stage", change "8" to --6--, |
| Column 3, | Line 1, | after "display", change "all" to --A11--, |
| | Line 17, | after "then", insert --B6--, |
| | | after "starts", delete "at B6" |

UNITED STATES PATENT AND TRADEMARK OFFICE

CERTIFICATE OF CORRECTION

PATENT NO. : 5,436,619

DATED : July 25, 1995

INVENTOR(S) : Young-Han Yun

It is certified that error appears in the above-indentified patent and that said Letters Patent is hereby corrected as shown below:

| | | |
|---|---|---|
| Column 4 | Line 24, | after "transmitted", insert comma " , ", |
| | Line 40, | after "among", change "POSAG" to --POCSAG--, |
| Column 5 | Line 11, | after "means", change "lit" to --10--, |
| Column 6 | Line 5, | after "At", delete "said", |
| | Line 21, | after "time", change "filter" to -- . After --, |
| | Line 43, | before "at", change "then," to --, then--. |

Signed and Sealed this

Twenty-sixth Day of November 1996

Attest:

BRUCE LEHMAN

*Attesting Officer* *Commissioner of Patents and Trademarks*